(12) United States Patent
Zhang et al.

(10) Patent No.: US 12,350,996 B2
(45) Date of Patent: Jul. 8, 2025

(54) VEHICLE HEAT EXCHANGE

(71) Applicant: Ford Global Technologies, LLC, Dearborn, MI (US)

(72) Inventors: Xiaogang Zhang, Novi, MI (US); Richard K Werth, Milan, MI (US); Mark Meinhart, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 18/359,442

(22) Filed: Jul. 26, 2023

(65) Prior Publication Data

US 2025/0033429 A1    Jan. 30, 2025

(51) Int. Cl.
| F28F 19/00 | (2006.01) |
| B60H 1/00 | (2006.01) |
| B60H 1/32 | (2006.01) |

(52) U.S. Cl.
CPC ....... B60H 1/00278 (2013.01); B60H 1/3227 (2013.01)

(58) Field of Classification Search
CPC .......................... B60H 1/00278; B60H 1/3227
USPC ......................................................... 165/41
See application file for complete search history.

(56) References Cited

U.S. PATENT DOCUMENTS

| 10,476,051 B2 | 11/2019 | Mardall et al. |
| 10,932,395 B2 | 2/2021 | Yen et al. |
| 11,389,765 B2 | 7/2022 | Roy et al. |
| 2009/0139781 A1 | 6/2009 | Straubel |
| 2020/0033070 A1 | 1/2020 | Vlahinos et al. |
| 2020/0333088 A1 | 10/2020 | Manzo |
| 2021/0156339 A1 | 5/2021 | Rathay et al. |
| 2022/0186947 A1 | 6/2022 | Boetcher et al. |
| 2022/0250762 A1 | 8/2022 | Sperrin et al. |
| 2022/0314517 A1 | 10/2022 | Benjamin |

FOREIGN PATENT DOCUMENTS

JP    2016164062 A    *    9/2016    ............... B60H 1/00

* cited by examiner

*Primary Examiner* — Davis D Hwu
(74) *Attorney, Agent, or Firm* — Vichit Chea; Price Heneveld LLP

(57) ABSTRACT

A battery chiller for a vehicle includes a housing having a first inlet, a second inlet opposing the first inlet, a first outlet having a toroid structure surrounding the second inlet, and a second outlet having a toroid structure surrounding the first inlet. A lattice is disposed within the housing defining a first plurality of channels and a second plurality of channels. The lattice defines a first inlet duct in fluid communication with the first inlet and the first channels, and a second inlet duct in fluid communication with the second inlet and the second channels. A first flow path is defined from the first inlet, through the first inlet duct, through the first plurality of channels and to the first outlet, and a second flow path is defined from the second inlet, through the second inlet duct, through the second plurality of channels and to the second outlet.

10 Claims, 8 Drawing Sheets

VEHICLE HEAT EXCHANGE

FIELD OF THE DISCLOSURE

The present disclosure generally relates to a heat exchanger, and more specifically a heat exchange for a vehicle such as a battery chiller for a vehicle.

BACKGROUND OF THE DISCLOSURE

Motor vehicles may include energy storage systems such as battery systems. Battery systems may produce excess heat while charging or discharging, which can result in the battery system temperature rising to elevated operating temperatures. A compact and efficient cooling system is desirable to cool the battery system and maintain a desired operating temperature.

SUMMARY OF THE DISCLOSURE

According to a first aspect of the present disclosure, a heat exchanger for a vehicle is provided. The heat exchanger includes a housing and a coolant outlet defined on a first end of the housing. The coolant outlet has a first toroid structure having a first central opening. A refrigerant outlet is defined on a second end of the housing. The refrigerant outlet has a second toroid structure having a second central opening. A coolant inlet is defined on the second end of the housing. The coolant inlet is routed through the second central opening of the refrigerant outlet. A refrigerant inlet is defined on the first end of the housing. The refrigerant inlet is routed through the first central opening of the coolant outlet. A lattice structure disposed in the housing defining a plurality of coolant channels and a plurality of refrigerant channels. The lattice structure defines a coolant duct in fluid communication with the plurality of coolant channels and a refrigerant duct in fluid communication with the plurality of refrigerant channels. The coolant outlet is in fluid communication with the plurality of coolant channels of the lattice structure and the refrigerant outlet is in fluid communication with the plurality of refrigerant channels of the lattice structure.

Embodiments of the first aspect of the present disclosure can include any one or a combination of the following features:
- the first toroid structure of the coolant outlet is a first torus structure, and wherein the second toroid structure of the refrigerant outlet is a second torus structure.
- the lattice structure is a gyroid structure;
- the housing has a central portion, a first tapered portion extending from the central portion and to the first toroid structure, and a second tapered portion extending from the central portion and to the second toroid structure;
- the housing and the lattice structure are constructed of the same material;
- a refrigerant flows along a refrigerant flow path that defined from the refrigerant inlet, through the refrigerant duct, through the plurality of refrigerant channels, and to the refrigerant outlet, and wherein a coolant flows along a coolant flow path defined from the coolant inlet, through the coolant duct, through the plurality of coolant channels, and to the coolant outlet;
- the refrigerant inlet and the refrigerant outlet are coupled to a refrigeration loop, and wherein the coolant inlet and the coolant outlet are coupled to a vehicle battery system, and further wherein the refrigerant flows through the refrigeration loop and the coolant flows through the vehicle battery system;
- said heat exchanger is configured as an evaporator of the refrigeration loop;
- the heat exchanger includes a coolant outlet tube coupled to the first toroid structure, and a refrigerant outlet tube coupled to the second toroid structure, wherein the refrigerant tube is routed along a bottom surface of the housing and proximate to the coolant outlet tube; and
- the heat exchanger includes a mounting bracket coupled to housing, wherein the coolant outlet tube and refrigerant outlet tube are routed through the mounting bracket.

According to a second aspect of the present disclosure, a heat exchanger for a vehicle battery system is provided. The heat exchanger includes a housing, a first inlet on a first end of the housing, and a first outlet on a second end of the housing. The first outlet has a first toroid structure defining a first central opening. The housing further includes a second inlet on the second end of the housing, and a second outlet on the first end of the housing. The second inlet is routed through the first central opening of the first outlet. The second outlet has a second toroid structure defining a second central opening and the first inlet is routed through the second central opening of the second outlet. A gyroid structure is disposed within the housing defining a first plurality of channels and a second plurality of channels. The gyroid structure defines a first inlet cone in fluid communication with the first inlet and a second inlet cone in fluid communication with the second inlet. A first flow path is defined from the first inlet of the housing, through the first inlet cone, through the first plurality of channels, and through the first outlet. A second flow path is defined from the second inlet of the housing, through the second inlet cone, through the second plurality of channels, and through the second outlet.

Embodiments of the second aspect of the present disclosure can include any one or a combination of the following features:
- the first inlet and the first outlet are coupled to said vehicle battery system, and wherein the second inlet and the second outlet are coupled to a refrigeration loop;
- said heat exchanger is configured as an evaporator of the refrigeration loop;
- the heat exchanger further includes a first outlet tube coupled to the first toroid structure and a second outlet tube coupled to the second toroid structure, where the second tube is routed along a bottom surface of the housing and proximate to the first outlet tube;
- the heat exchanger further includes a support bracket coupled to the first outlet tube and to the second outlet tube.

According to a third aspect of the present disclosure, a battery chiller for a vehicle battery system is provided. The battery chiller includes a housing having a first inlet, a second inlet opposing the first inlet, a first outlet having a first toroid structure surrounding the second inlet, and a second outlet having a second toroid structure surrounding the first inlet. A minimal surface structure is disposed within the housing defining a first plurality of channels and a second plurality of channels. The minimal surface structure defines a first inlet duct in fluid communication with the first inlet and the first plurality of channels, and a second inlet duct in fluid communication with the second inlet and the second plurality of channels. A first flow path is defined from the first inlet, through the first inlet duct, through the first plurality of channels and to the first outlet, and a second flow path is defined from the second inlet, through the second inlet duct, through the second plurality of channels and to the second outlet.

Embodiments of the third aspect of the present disclosure can include any one or a combination of the following features:

the minimal surface structure is a gyroid structure;
the toroid structure outlet is a first torus structure, and the second toroid structure is a second torus structure;
the first inlet and the first outlet are coupled to said vehicle battery system, and the second inlet and the second inlet is coupled to a vehicle battery refrigeration system, and wherein a coolant flows along the first flow path, through said vehicle battery system, and returns to the first inlet, and further wherein, a refrigerant flows along the second flow path, through the minimal surface structure, and returns to the second inlet; and
the battery chiller further includes a first outlet tube coupled to the first toroid structure, a second outlet tube coupled to the second toroid structure, where the second tube is routed along a bottom surface of the housing and proximate to the first outlet tube, and a support bracket coupled to the first outlet tube and to the second outlet tube.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
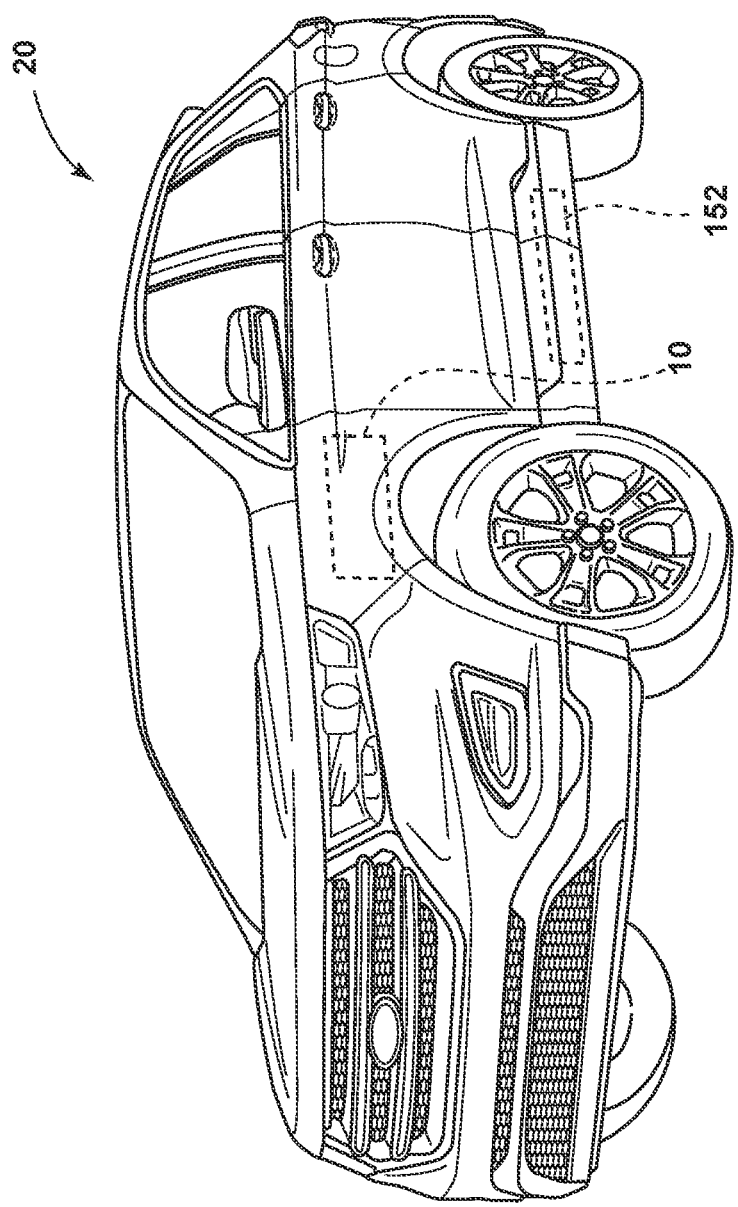
FIG. 1 is a front perspective view of an electric powered motor vehicle equipped with a heat exchanger configured to cool a battery system, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 4:
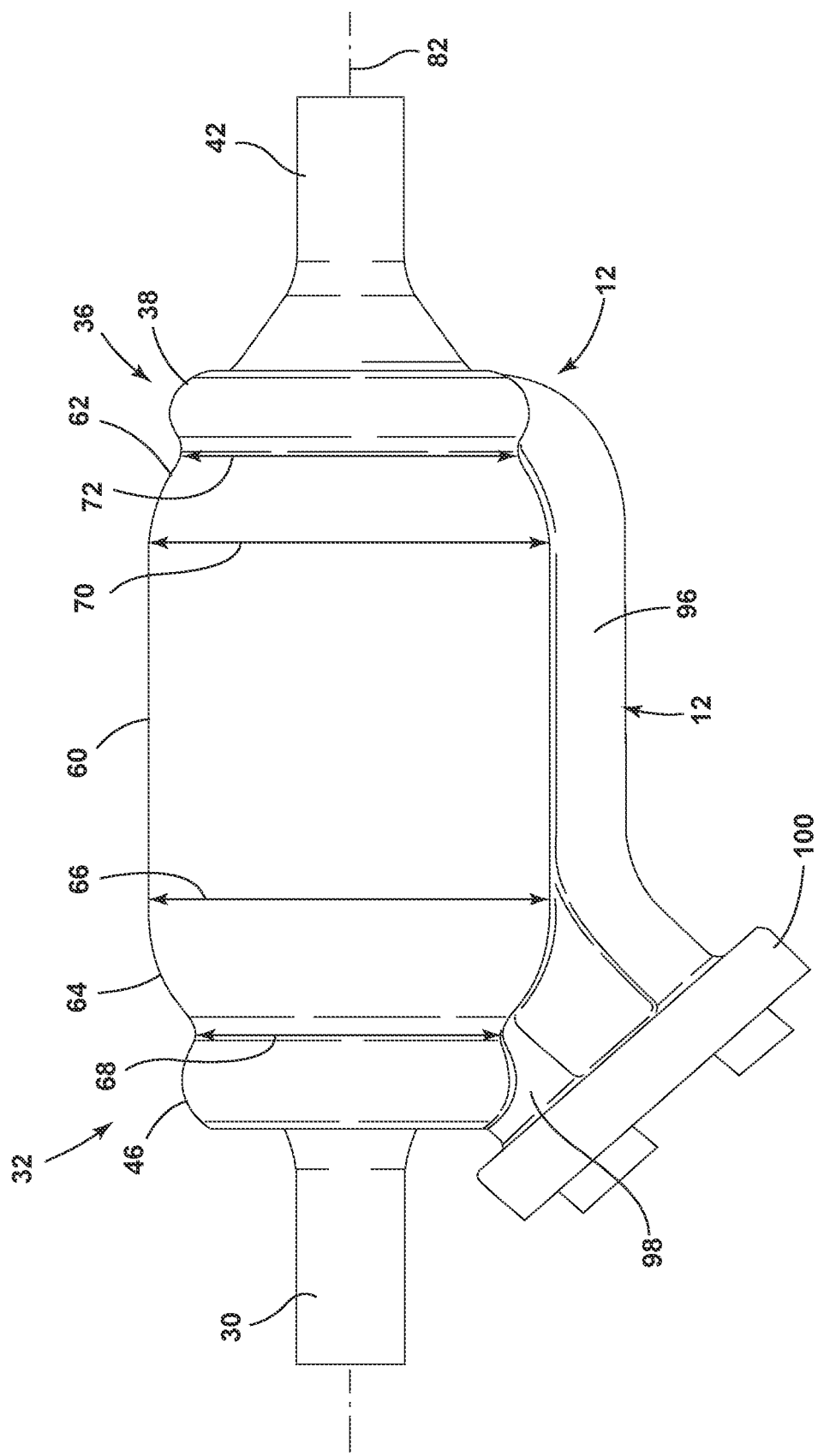
FIG. 4 is side elevation view of the heat exchanger.

For purposes of description herein, the terms "upper," "lower," "right," "left," "rear," "front," "vertical," "horizontal," and derivatives thereof shall relate to the concepts as oriented in FIG. 4. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat exchanger having a minimal surface structure defining a first volume and a second volume. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, reference numeral 20 generally designates a wheeled automotive or motor vehicle. The motor vehicle 20 may be an electric vehicle having a battery system 152 supplying electric power to one or more motors according to one example. While the vehicle 20 may be an electric vehicle, the present disclosure is not limited to electric motor systems as a source of locomotive power for the vehicle 20. Rather, other sources may be utilized in providing locomotive power to the vehicle 20. For example, locomotive power may be provided to the vehicle 20 by internal combustion engines, fuel cells, and/or petroleum-based fuel engines. The vehicle may be provided locomotive power by a combination or hybrid system that may include an internal combustion engine, battery cells, and/or electric motors systems. According to various examples, the vehicle 20 may be driver-controlled, semi-autonomous, fully-autonomous, or any combination of user-controlled and automated. For example, the semi-autonomous example of the vehicle 20 may perform many, or all, commuting functions (e.g., increasing speed, decreasing speed, turning, signaling, etc.) independent of user interaction while the user maintains override control of the vehicle 20. A battery chiller 10, also referred to as a heat exchanger 10, is provided within an internal compartment of the vehicle 20.

Referring to FIGS. 2-8B, the heat exchanger 10 generally includes a housing 12, also referred to as a chiller body, and a lattice structure 14, also referred to as a minimal surface structure 14, disposed in the housing 12. The housing 12 includes a first inlet 30 on a first end 32 of the housing 12 and a first outlet 34 on a second end 36 of the housing 12, wherein the first outlet 34 has a first toroid structure 38 defining a first central opening 40. The housing 12 further includes a second inlet 42 on the second end 36 of the housing 12, where the second inlet 42 is routed through the first central opening 40 of the first outlet 34, and a second outlet 44 on the first end 32 of the housing 12, where the second outlet 44 has a second toroid structure 46 defining a second central opening 48, and wherein the first inlet 30 is routed through the second central opening 48 of the second outlet 44. The lattice structure 14 defines a first plurality of channels 50 and a second plurality of channels 52. The lattice structure 14 further defines a first duct 54 in fluid communication with the first plurality of channels 50 and a second duct 56 in fluid communication with the second plurality of channels 52, wherein the first outlet 34 is in fluid communication with the first plurality of channels 50 of the lattice structure 14 and the second outlet 44 is in fluid communication with the second plurality of channels 52 of the lattice structure 14.

Figure 2:
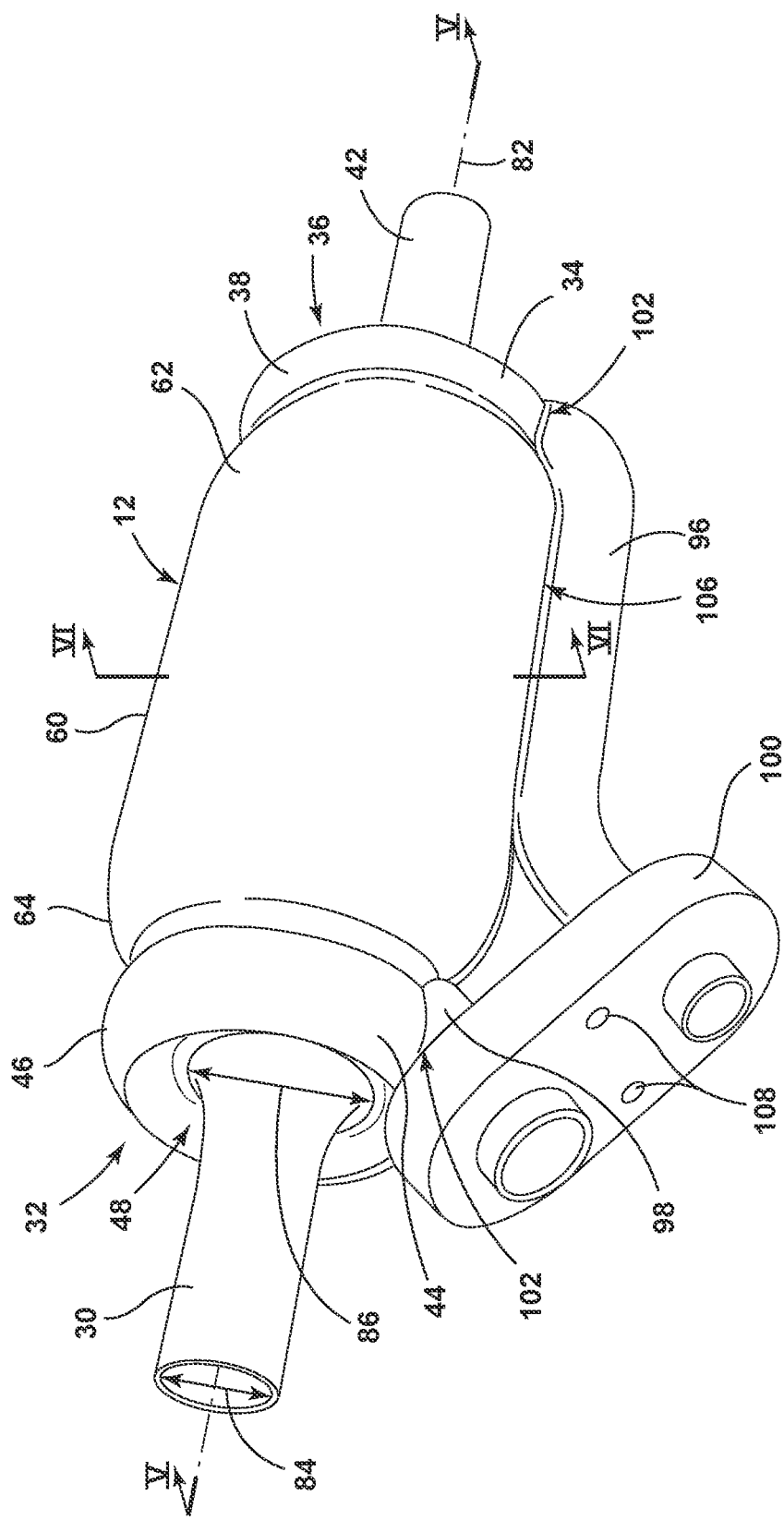
FIG. 2 is a front perspective of the heat exchanger.
Figure 3:
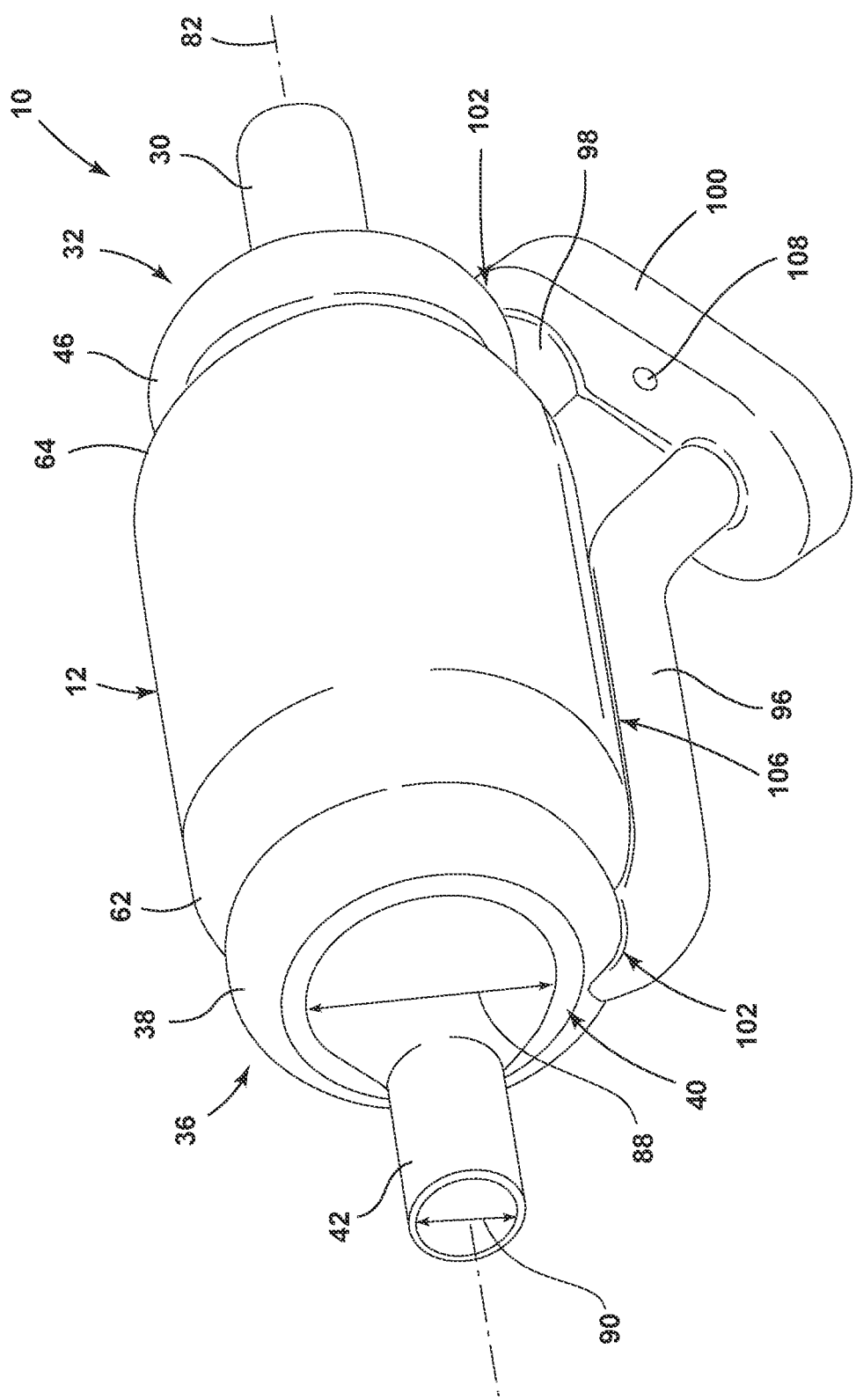
FIG. 3 is a rear perspective of the heat exchanger.

Referring to FIGS. 2-4, the housing 12 includes the first toroid structure 38 on the second end 36 and the second toroid structure 46 on the first end 32, generally referred to as the toroid structures 38, 46, and a central housing portion 60. As illustrated, the central housing portion 60 has a cylindrical structure. The central housing portion 60 is not limited to the cylindrical structure and may be configured as a cuboid or other prism structure according to other examples. The central housing portion 60 generally intersects with the toroid structures 38, 46 to form the housing 12. The central housing portion 60 may have a first tapered portion 62 that intersects the first toroid structure 38 and a second tapered portion 64 that intersects the second toroid structure 46.

The first and second tapered portions 62 and 64 generally extend from the central body portion 60 to the first toroid structure 38 and the second toroid structure 46, respectively. The first tapered portion 62 and the second tapered portion 64 may each have a generally conical or funnel shape. The first tapered portion 62 generally has a first diameter 70 proximate the central housing portion 60 and a second diameter 72, wherein the first tapered portion 62 intersects the first toroid structure 38. Similarly, the second tapered portion 64 generally has a first diameter 66 proximate the central housing portion 60 and a second diameter 68, wherein the second tapered portion 64 intersects the second toroid structure 46. The first diameters 66, 70 generally have a substantially similar diameter as the central housing portion 60. The second diameters 68, 72 generally each have a diameter less than the diameters of the first or second toroid structures 38, 46. The second diameter 72 for the first tapered portion 62 may be substantially similar to the second diameter 68 of the second tapered portion 64. The second diameter 72 for the first tapered portion 62 may also be different than the second diameter 68 of the second tapered portion 64.

Figure 5:
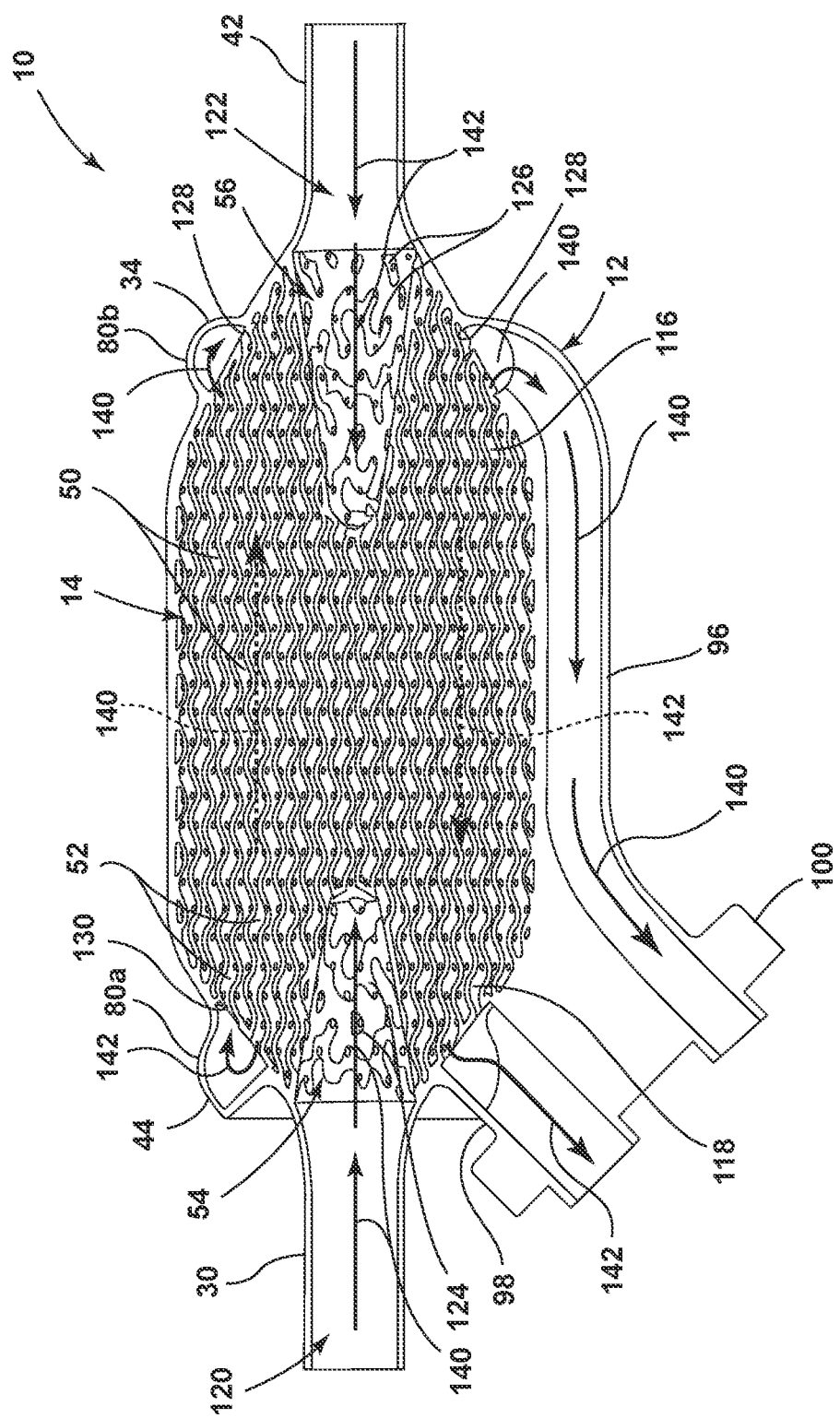
FIG. 5 is a side cross-sectional view of the heat exchanger taken through line V-V in FIG. 2.

Referring still to FIGS. 2-4 and now also FIG. 5, the housing 12 may also include the first outlet 34 on the second end 36 of the housing 12 and the second outlet 44 on the first end 32 of the housing 12. The first outlet 34 is generally defined by the first toroid structure 38 and the second outlet 44 is generally defined by the second toroid structure 46. The toroid structures 38, 46 are generally a surface of revolution with a central opening or hole in the middle. The surface of revolution is generally defined by a shape having a perimeter 80a, 80b rotated around an axis of rotation 82. For example, a circle may be rotated around the axis of rotation creating a toroid structure, and specifically a torus structure. The shape having the perimeter 80a, 80b may be a symmetrical shape, such as a circle, square or, a rectangle, but may also be an asymmetrical shape. The first toroid structure 38 is defined by a first perimeter 80b rotated around the axis of rotation 82. The first perimeter 80b of the first toroid structure defines the first central opening 40. Similarly, the second toroid structure 46 is defined by a second perimeter 80a rotated around the axis of rotation 82. The second perimeter 80a of the second toroid structure 46 defines the second central opening 48.

The housing 12 further includes the first inlet 30 on the first end 32 of the housing 12 and the second inlet 42 on the second end 36 of the second of the housing 12. The first inlet 30 generally extends from the second toroid structure 46 and away from the housing 12. The first inlet 30 may extend along the axis of rotation 82. The first inlet 30 has a first diameter 84 and may taper or narrow to a second diameter 86 as it extends away from the second toroid structure 46. The second diameter 86 is defined where the second toroid structure 46 and the first inlet 30 intersect. The first diameter 84 may generally be the narrowest portion of the first inlet 30. Alternatively, the first inlet 30 may extend away from the housing 12 having just the first diameter 86.

Similarly, the second inlet 42 generally extends from the first toroid structure 38 and away from the housing 12. The second inlet 42 may extend along the axis of rotation 82. The second inlet 42 has a first diameter 88 and may taper or narrow to a second diameter 90 as it extends away from the first toroid structure 38. The first diameter 88 is defined where the first toroid structure 38 and the second inlet 42 intersect. The second diameter 90 may generally be the narrowest portion of the second inlet 42. Alternatively, the second inlet 42 may extend away from the housing 12 having just the first diameter 88. The first diameter 84 of the first inlet 30 may be substantially equal to the first diameter 90 of the second inlet 42. The second diameter 86 of the first inlet 30 may also be substantially equal to the second diameter 88 of the second inlet 42.

Referring again to FIGS. 2-4, the housing 12 may include a first outlet tube 96, a second outlet tube 98, and a bracket or mounting bracket 100. The first outlet tube 96 and second outlet tube 98 are in fluid communication with the first outlet 34 and the second outlet 44, respectively. The first and second outlet tubes 96, 98 may be coupled to a lower portion 102 of the first outlet 34 and a lower portion of the second outlet 44, respectively. This may allow for gravity to assist with removal of the first and second fluids 22, 24 from their respective outlets 34, 44. However, the first and second outlet tubes 96, 98 are not limited to the lower portions 102 and may be coupled to the first and second outlets 34, 44 in other locations. As illustrated in FIG. 4, the second outlet tube 98 is routed from the second outlet 44 to the bracket 100. The first outlet tube 96 is routed from the first outlet 34, along a lower surface 106 of the housing 12, and to the bracket 100.

The first and second outlet tubes 96, 98 may extend through the bracket 100 and may be configured to couple to return lines or tubes for a cooling system, as discussed below. The bracket 100 may be configured to couple to the vehicle 20, which may include a bracket disposed in the vehicle. The bracket 100 may generally support the heat exchanger 10. The bracket 100 may have fastener holes 108 that may be used with mechanical fasteners, such as bolts, screws, rivets, or other permanent or semi-permanent fastener, to couple the heat exchanger 10 to the vehicle 20. Alternatively or additionally, the bracket 100 may be coupled to the vehicle 20 using chemical fasteners, such as adhesives, or welding. The bracket 100 may be coupled directly to the housing 12 and may not be attached to the first and second outlet tubes 96, 98. Additionally, the bracket 100 and outlet tubes 96, 98 may have different configurations to fit a compartment or space within the vehicle 20. The heat exchanger 10 may also not include the mounting bracket 100 and the first and second outlet tubes 96, 98.

Figure 6:
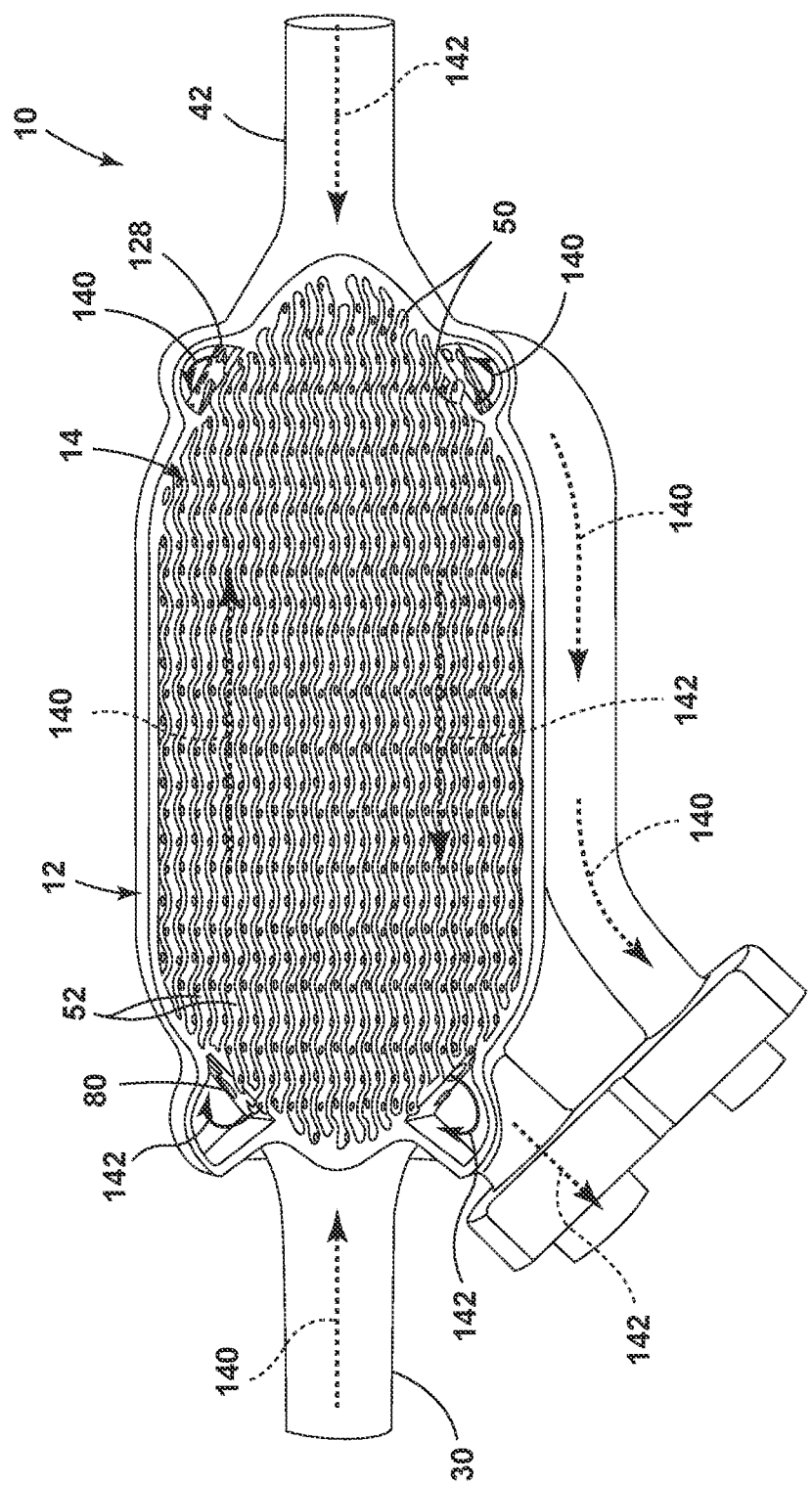
FIG. 6 is a side cross-sectional view of the heat exchanger taken through line VI-VI in FIG. 2.

Referring to FIGS. 5 and 6, the heat exchanger 10 includes the lattice structure 14 disposed within an interior 92 of the housing 12. The lattice structure 14 generally defines the first plurality of channels 50 and the second plurality of channels 52. The lattice structure 14 may be a periodic minimal surface structure or a triply periodic surface structure having a first volume 116 and a second volume 118. The first volume 116 may be defined by the first plurality of channels 50 and the second volume 118 may be defined by the second plurality of channels 52. The periodic minimal surface may provide for a larger shared surface area between the first volume 116 and the second volumes 118 than other structures. The larger shared surface area of the periodic minimal surface generally allows for more efficient heat transfer between the first volume 116 and the second volume 118. The first volume 116 and the second volume 118 may be substantially similar. The first volume 116 and the second volume 118 may be larger than the second volume, and vice versa. The unequal first and second volume 116, 118 may account for different heat capacities of the respective first and second fluids 22, 24 flowing therethrough, as discussed further below.

The lattice structure may be the triply periodic surface having the first and second volumes 118, 116. For example, the triply periodic surface may be a gyroid or a gyroid structure, which generally separates a volume into two oppositely congruent irregular network of passages or channels. Gyroids are both intersection-free and infinitely triply periodic minimal surfaces, and the structures can be approximated through the following equation: $(\sin[x]\cos[y])+(\sin[y]\cos[z])+(\sin[z]\cos[x])=0$, where x, y, and z are coordinates for a point on 3-dimensional graph having an x-y-, z-axis. Gyroids have large surface areas, and when a gyroid structure is incorporated into a heat exchanger the structure allows substantial thermal contact between fluids housed within the passages. The first plurality of channels 50 and the second plurality of channels 52 may generally be the two oppositely congruent irregular network of passages when the lattice structure 14 is a gyroid structure. The triply periodic surface is not limited to the gyroid and may be, among others, a diamond surface lattice or a Schwarz surface.

Referring to FIGS. 5 and 6, the heat exchanger 10 may include a first inlet portion 120 and a second inlet portion 122 within the housing 12. The lattice structure 14 and the housing 12 define the first inlet portion 120 proximate the first end 32 of the housing 12 and a second inlet portion 122 proximate the second end 36 of the housing 12. The first inlet portion 120 includes the first inlet 30 and the first duct 54 and the second inlet portion 122 includes the second inlet 42 and the second duct 56.

The first duct 54 is configured to distribute the first fluid 22 flowing from the first inlet 30 to the first plurality of channels 50. The first duct 54 may be configured to evenly distribute the first fluid 22 evenly between the first plurality of channels 50. As illustrated, the first duct 54 has a generally conical shape, and more specifically a conical shape with a rounded tip. However, the first duct 54 is not limited to such shape and may have a cylindrical, spherical, cuboid, or other shape configured to allow the first fluid 22 to flow from the first duct 54 to the first plurality of channels 50. The first duct 54 may have a first plurality of inlet apertures 124 to allow the first fluid 22 to flow between the first duct 54 and the first plurality of channels 50. Stated differently, the first duct 54 and the first plurality of channels 50 are in fluid communication through the first plurality of inlet apertures 124.

The first plurality of inlet apertures 124 may be defined by where the first duct 54 and the lattice structure 14 intersect. The plurality of inlet apertures 124 may be defined by the intersection of the first duct 54 with the first plurality of channels 50. The second plurality of channels 52 that intersect with the first duct 54 are generally plugged, blocked, or routed to a proximate second channel to maintain separation of the first volume 116 and the second volume 118 and to prevent mixing of the first fluid 22 and second fluid 24.

Similarly, the second duct 56 is configured to distribute the second fluid 24 flowing from the second inlet 42 to the second plurality of channels 52. The second duct 56 may be configured to evenly distribute the second fluid 24 evenly between the second plurality of channels 52. As illustrated, the second duct 56 has a generally conical shape, and more specifically a conical shape with a rounded tip. However, the second duct 56 is not limited to such shape and may have a cylindrical, spherical, cuboid, or other chap configured to allow the second fluid 24 to flow from the second duct 56 to the second plurality of channels 52. The second duct 56 may have a second plurality of inlet apertures 126 to allow the second fluid 24 to flow between the second duct 56 and the second plurality of channels 52. Stated differently, the second duct 56 and the second plurality of channels 52 are in fluid communication through the second plurality of inlet apertures 126.

The second plurality of inlet apertures 126 may be defined by the intersection of the second duct 56 and the lattice structure 14. The plurality of inlet apertures 126 may be defined by the intersection of the second duct 56 with the second plurality of channels 52. The first plurality of channels 50 that intersect with the second duct 56 are plugged, blocked, or routed to a proximate first channel to maintain separation of the first volume 116 and the second volume 118 and to prevent mixing of the first fluid 22 and second fluid 24.

Referring still to FIGS. 5 and 6, the first outlet 34 and the second outlet 44 are generally in fluid communication with the first plurality of channels 50 and the second plurality of channels 52, respectively. A first plurality of outlet apertures 128 fluidly couple the first outlet 34 with the first plurality of channels 50 and a second plurality of outlet apertures 130 fluidly couple the second outlet 44 with the second plurality of channels 52. The first plurality of outlet apertures 128 are defined by the intersection of the first toroid structure 38 and the first plurality of channels 50 of the lattice structure 14. The second plurality of channels 52 that may intersect with the first toroid structure 38 are plugged, blocked, or routed to a proximate second channel to maintain separation of the first volume 116 and the second volume 118 and to prevent mixing of the first fluid 22 and second fluid 24. The second plurality of outlet apertures 130 are defined by the intersection of the second toroid structure 46 and the second plurality of channels 52 of the lattice structure 14. The first plurality of channels 50 that may intersect with the second toroid structure 46 are plugged, blocked, or routed to a proximate first channel to maintain separation of the first volume 116 and the second volume 118 and to prevent mixing of the first fluid 22 and second fluid 24.

Referring still to FIGS. 5 and 6, the heat exchanger defines a first flow path, as shown by arrow 140, for the first fluid 22 and a second flow path, as shown by arrow 142, for the second fluid 24. The first flow path 140 starts at the first inlet 30, through the first duct 54, through the first plurality of inlet apertures 124 to the first plurality of channels 50, through the first plurality of channels 50 to the first plurality of outlet apertures 128, and through the first plurality of outlet apertures 128 to the first outlet 34. The first flow path 140 may also include flowing from the first outlet 34 to the first outlet tube 96. As the first fluid 22 flows along the first flow path 140 in the first duct 54, the first fluid 22 may be distributed to the first plurality of inlet apertures 124 to provide a substantially even and constant flow to each channel of the first plurality of channels 50. As the first fluid 22 flows along the first flow path 140, there may be a substantially even and constant flow from the first plurality of channels 50 to the first outlet 34.

The second flow path 142 starts at the second inlet 42, through the second duct 56, through the second plurality of inlet apertures 126 to the second plurality of channels 52, through the second plurality of channels 52 to the second plurality of outlet apertures 130, and through the second plurality of outlet apertures 130 to the second outlet 44. The second flow path 142 may also include flowing from the second outlet 44 to the second outlet tube 98. As the second fluid 24 flows along the second flow path 142 in the second duct 56, the second fluid 24 may be distributed to the second plurality of inlet apertures 126 to provide a substantially even and constant flow to each channel of the second plurality of channels 52. As the second fluid 24 flows along the second flow path 142 there may be a substantially even and constant flow from the second plurality of channels 52 to the second outlet 44. The first and second tapered portions 62, 64 of the housing along with the lattice structure 14 following the tapered portions 62, 64 may assist with distributing the first flow path 140 and the second flow path 142 throughout the first and second volumes 116, 118. This distribution of the first and second flows 140, 142 may assist with heat exchange between the first and second fluids 22, 24 by reducing high and low flow portions on each flow path 140, 142.

Figure 7A:
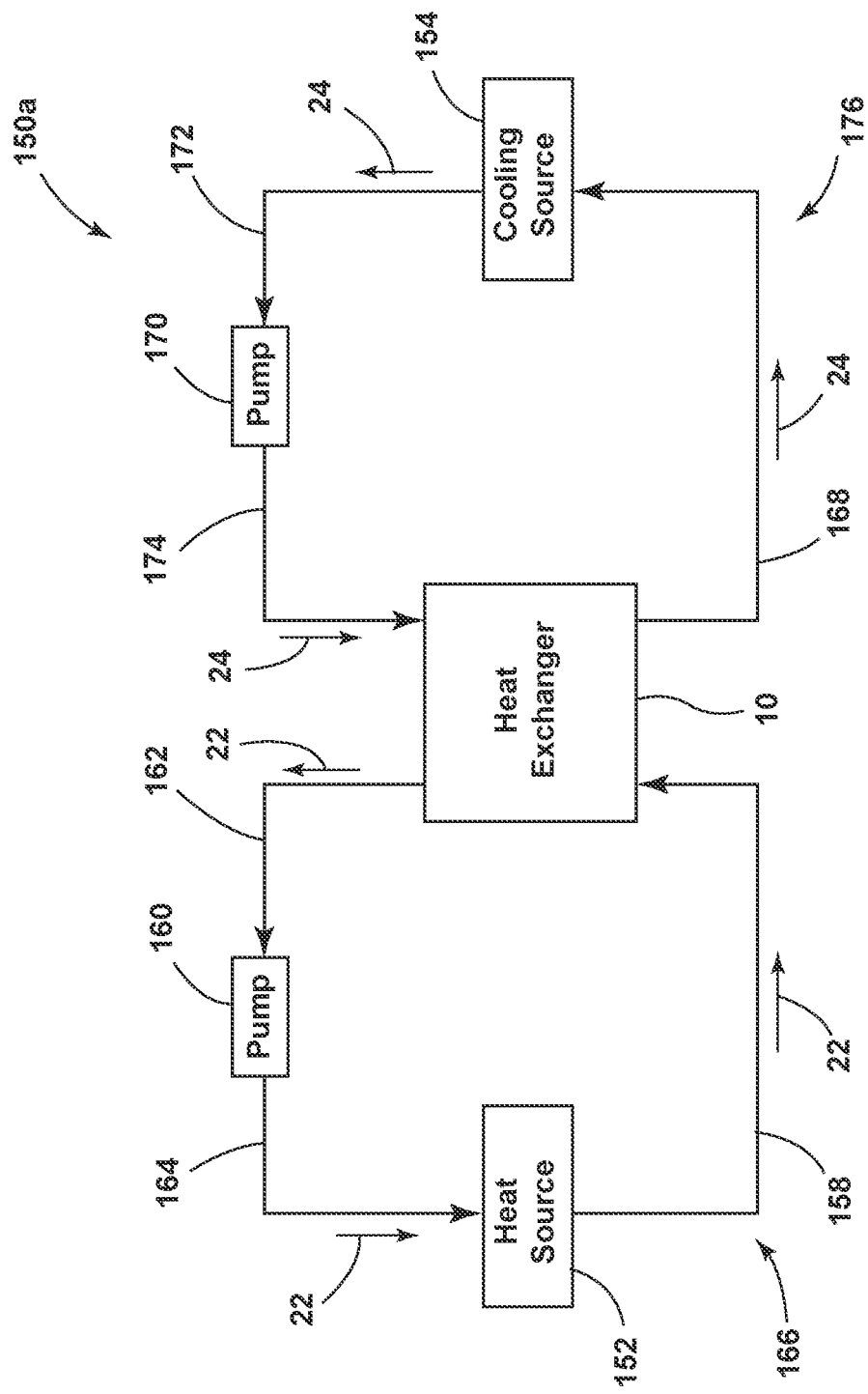
FIG. 7A is a block diagram of a vehicle cooling system including the heat exchanger to cool a heat source according to one example.
Figure 7B:
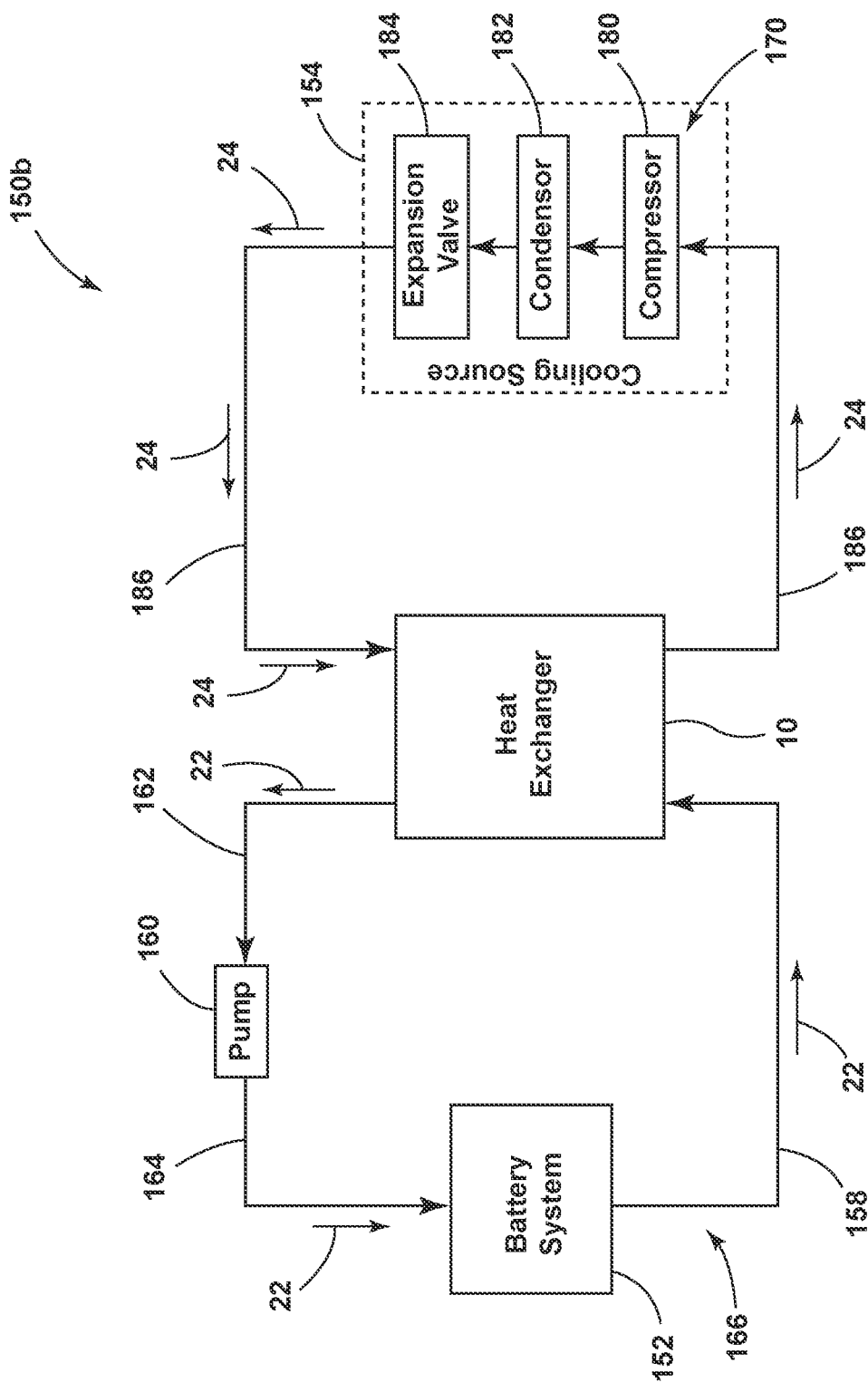
FIG. 7B is a block diagram of a vehicle cooling system including a heat exchanger configured to cool the battery system.

Referring to FIGS. 7A and 7B, the heat exchanger 10 may be included in a cooling system disposed in the vehicle as shown in one example in FIG. 7A or a battery cooling system 150a, 150b disposed in the vehicle 20 as shown in FIG. 7B in another example. The cooling system 150a includes the heat exchanger 10 coupled to a heat source 152 and a cooling source 154. The heat source 152 may be a battery bank, an internal combustion engine, a transmission, a computer or controller, or other heat source within the vehicle 20. The cooling source 154 may be a refrigeration loop, a radiator, or other cooling source within the vehicle 20.

Referring to FIG. 7A, the cooling system 150a is illustrated as having the heat source 152 coupled to the first inlet 30 using a first tube or pipe 158. The first outlet 34 may be coupled to a first pump 160 with a second tube or pipe 162. The first pump 160 may be coupled to the heat source 152 using a third tube or pipe 164. While the first pump 160 is depicted as between the first outlet 34 of the heat exchanger 10 and the heat source 152, the first pump 160 may be located between the heat source 152 and the first inlet 30 of the heat exchanger 10 or may be integrated with the heat source 152. A first fluid loop 166 of the cooling system 150a is defined by at least the first, second, and third tube, 158, 162, 164, the heat source 152, the first volume 116 of the heat exchanger 10, and the first pump 160. The first pump 160 may be configured to circulate the first fluid 22 through the first fluid loop 166.

The cooling source 154 is coupled to the second outlet 44 of the heat exchanger 10 with a fourth tube or pipe 168. The cooling source 154 is coupled to a second pump 170 with a fifth tube or pipe 172. The second pump 170 is coupled to the second inlet 42 with a sixth tube or pipe 174. While the second pump 170 is depicted as between the second inlet 42 of the heat exchanger 10 and the cooling source 154, the second pump 170 may be located between the cooling source 154 and the second outlet 44 of the heat exchanger 10 or may be integrated with the cooling source 154. A second fluid loop 176 of the cooling system 150a is defined by at least the fourth, fifth, and sixth tube, 168, 172, 174, the second volume 118 of the heat exchanger 10, and the second pump 170. The second pump 170 may be configured to circulate the second fluid 24 through the second fluid loop 176.

As the first fluid 22 is circulated through the first fluid loop 166 by the first pump 160, the first fluid 22 exits the heat source 152 at a high temperature and enters the heat exchanger 10. The first fluid 22 transfers heat or energy to the second fluid 24 also flowing through the heat exchanger 10 and exits the heat exchanger 10 at a lower temperature than the first fluid 22 entered. The first fluid 22 enters the heat source 152 and is returned to the high temperature, and continuous the cycle. As the second fluid 24 is circulated through the second fluid loop 176 by the second pump 170, the second fluid 24 exits the cooling source at a low temperature and enters the heat exchanger 10. The second fluid 24 receives the heat or energy from the first fluid 22 as it flows through the heat exchanger 10 and exits the heat exchanger at a higher temperature than the first fluid 22 entered. The second fluid 24 returns to the cooling source 154 and is returned to the low temperature, and continues the cycle.

The first fluid 22 and the second fluid 24 may be a liquid or a gas as the first and second fluid 22 and 24 flow through the respective first or second fluid loops 166, 176. While the first fluid 22 and/or second fluid 24 are flowing their respective fluid loops 166, 176, the first fluid 22 and/or second fluid 24 may undergo a phase change from a liquid to a gas and a phase change from a gas to a liquid. In some examples, the first fluid 22 may be a coolant 22 and the second fluid 24 may be a refrigerant 24.

Referring to FIG. 7B, the cooling system 150b is illustrated as having vehicle battery system as the heat source 152 and a refrigeration loop as the second fluid loop 176. The cooling source 154 may be a portion of the refrigeration system with the heat exchanger configured as an evaporator. In such examples, the second fluid 24 would be a refrigerant 24 flowing through the second fluid loop 176. As the refrigerant 24 flows through the heat exchanger 10, the refrigerant 24 undergoes a phase change from a liquid to a gas thereby removing heat or energy from the first fluid 22 flowing through the heat exchanger 10. The second fluid 24 returns to the cooling source 154 as a low-pressure gas. A compressor 180 of the cooling source 154 compresses the refrigerant 24 to a high-pressure gas. The compressor 180 may also be configured as the second pump 170 for the second fluid loop 176. The refrigerant 24 as the high-pressure gas subsequently flows from the compressor 180 to a condenser 182 where the refrigerant 24 is phase changed to a high-pressure liquid. The refrigerant 24 then enters an expansion valve or capillary tube 184 and exits as a low-pressure liquid. The refrigerant 24 then enters the heat exchanger 10, repeating the cycle. A plurality of pipes or tubes 186 couple the various components of the second fluid loop 176 together.

Referring again to FIGS. 2-6, the heat exchanger 10 may be manufactured using an additive manufacturing process. Generally, in additive manufacturing processes, digital three-dimensional design data is used to build components in layers by depositing materials on a build platform. The material within the layers and the material of the separate layers may be bonded or fused together through the use of laser beams directed at points indicated by the computer-generated design data. Layers are added on top of one another and fused to bond with the previous layers at predefined points.

The heat exchanger 10 may be formed or manufactured using any practicable additive manufacturing process, for example, but not limited to, extrusion additive manufacturing (e.g., fused filament fabrication), photopolymerization additive manufacturing (e.g., stereolithography or SLA), powder bed fusion additive manufacturing, material jetting additive manufacturing, binder jetting additive manufacturing, directed energy deposition additive manufacturing, lamination, additive manufacturing, and/or any combination thereof. In some instances, directed energy deposition additive manufacturing and powder bed fusion additive manufacturing allow for production objects using metals. For example, metals such as stainless steel, titanium, aluminum, cobalt chrome, steel, and/or any combination thereof may be used. The additive manufacturing process may be advantageous for forming the heat exchanger 10, by allowing for the combined manufacturing of the housing 12 and the lattice structure 14. The additive manufacturing process may also allow for creation or use of highly complex or intricate lattice structures 14 that otherwise would be unable to be produced. The heat exchanger 10 is not limited to such additive manufacturing process.

Use of the present device may provide for a variety of advantages. For example, the heat exchanger 10 may provide for efficient heat transfer between the first fluid 22 and the second fluid 24. The lattice structure 14 may provide for a high surface area between the first volume 116 and the second volume 118 of the heat exchanger 10 allowing for the more efficient heat transfer. Additionally, the efficient heat transfer thereby may provide for more efficient cooling or greater heat removal from a battery system or other heat source 152. Further, the heat exchanger 10 may be used as an evaporator in a refrigeration loop, thereby allowing a refrigeration loop to cool the second fluid 24, which may be the coolant 24. Furthermore, the first and second flow paths 140, 142 may provide for even distribution of the first and second fluids 22, 24 throughout the heat exchanger 10. The even distribution may also allow for more efficient heat transfer between the first and second fluids 22, 24. Additionally, the first and second inlets 30, 42 being routed through the central openings 40, 48 of the first and second toroid structures 38, 46 may provide for more efficient heat transfer as the first and second fluids 22, 24, due to heat transfer between the first and second inlets 30, 42 and the first and second outlets 34, 44. Additional benefits or advantages of using this device may also be realized and/or achieved.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A heat exchanger for a vehicle, comprising:
   a housing;
   a coolant outlet defined on a first end of the housing, wherein the coolant outlet has a first toroid structure having a first central opening;
   a refrigerant outlet defined on a second end of the housing, wherein the refrigerant outlet has a second toroid structure having a second central opening;
   a coolant inlet defined on the second end of the housing, wherein the coolant inlet is routed through the second central opening of the refrigerant outlet;
   a refrigerant inlet defined on the first end of the housing, wherein the refrigerant inlet is routed through the first central opening of the coolant outlet; and
   a lattice structure disposed in the housing defining a plurality of coolant channels and a plurality of refrigerant channels, wherein the lattice structure defines a coolant duct in fluid communication with the plurality of coolant channels and a refrigerant duct in fluid communication with the plurality of refrigerant channels, and wherein the coolant outlet is in fluid communication with the plurality of coolant channels of the lattice structure and the refrigerant outlet is in fluid communication with the plurality of refrigerant channels of the lattice structure.

2. The heat exchanger of claim 1, wherein the first toroid structure of the coolant outlet is a first torus structure, and wherein the second toroid structure of the refrigerant outlet is a second torus structure.

3. The heat exchanger of claim 1, wherein the lattice structure is a gyroid structure.

4. The heat exchanger of claim 1, wherein the housing has a central portion, a first tapered portion extending from the central portion and to the first toroid structure, and a second tapered portion extending from the central portion and to the second toroid structure.

5. The heat exchanger of claim 1, wherein the housing and the lattice structure are constructed of the same material.

6. The heat exchanger of claim 1, wherein a refrigerant flows along a refrigerant flow path that defined from the refrigerant inlet, through the refrigerant duct, through the plurality of refrigerant channels, and to the refrigerant outlet, and wherein a coolant flows along a coolant flow path defined from the coolant inlet, through the coolant duct, through the plurality of coolant channels, and to the coolant outlet.

7. The heat exchanger of claim 6, wherein the refrigerant inlet and the refrigerant outlet are coupled to a refrigeration loop, and wherein the coolant inlet and the coolant outlet are coupled to a vehicle battery system, and further wherein the refrigerant flows through the refrigeration loop and the coolant flows through the vehicle battery system.

8. The heat exchanger of claim 7, further includes:
   wherein said heat exchanger is configured as an evaporator of the refrigeration loop.

9. The heat exchanger of claim 1, further includes:
   a coolant outlet tube coupled to the first toroid structure; and
   a refrigerant outlet tube coupled to the second toroid structure, wherein the refrigerant tube is routed along a bottom surface of the housing and proximate to the coolant outlet tube.

10. The heat exchanger of claim 9, further includes
    a mounting bracket coupled to the housing, wherein the coolant outlet tube and refrigerant outlet tube are routed through the mounting bracket.

* * * * *